June 16, 1953   V. H. JUNGJOHANN   2,641,962
INTERMITTENT FILM-FEEDING MECHANISM
Filed Feb. 12, 1952
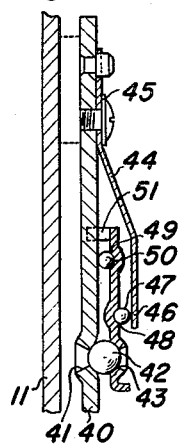
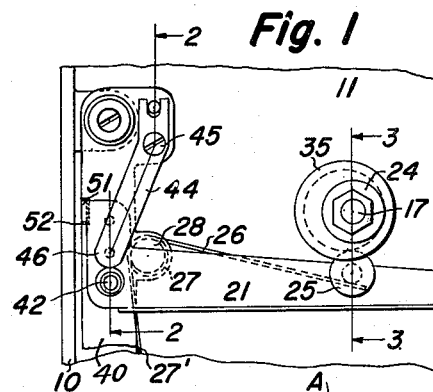
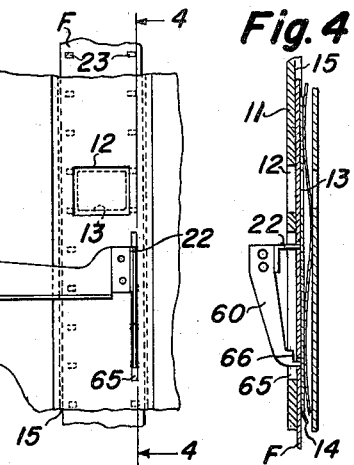
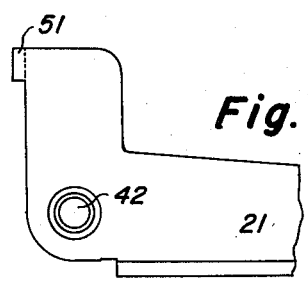
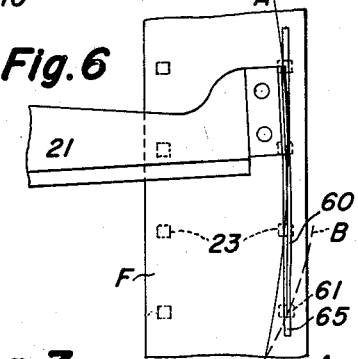
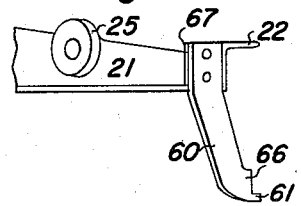
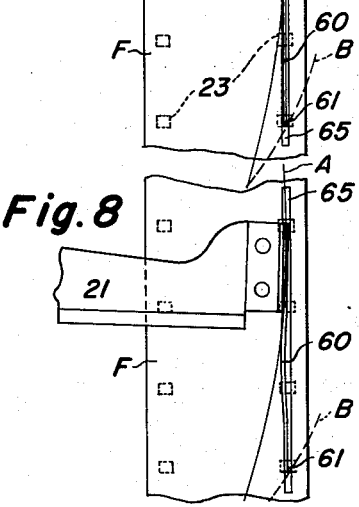
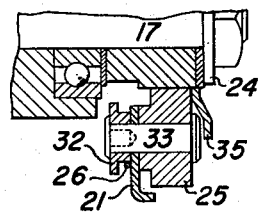
VERNON H. JUNGJOHANN
INVENTOR.
BY Daniel I. Mayne
ATTORNEYS Patented June 16, 1953

2,641,962

UNITED STATES PATENT OFFICE 2,641,962

INTERMITTENT FILM-FEEDING MECHANISM

Vernon H. Jungjohann, Rochester, N. Y., assignor to Eastman Kodak Company, Rochester, N. Y., a corporation of New Jersey Application February 12, 1952, Serial No. 271,188

3 Claims. (Cl. 88—18.4)

1

The present invention relates to intermittent film-feeding devices, such as used on motion-picture apparatus, although not limited to this use alone.

A very common form of intermittent film feeding mechanism comprises a reciprocally-mounted claw which is adapted to engage a film perforation at the top of its stroke, advance the film a given length on its downward stroke (usually a frame if the film is a motion-picture film), release the film perforation for its upward stroke and again engage a subsequent perforation for the next downward stroke. There are two general types of claw mechanisms—the ratchet type and the positive type. In the ratchet type, the claw is normally spring-pressed into engagement with the film under the action of a light spring, is reciprocated in a single plane and its upper edge is tapered so that it will ratchet or cam out of engagement with the engaged perforation at the start of the upward movement and will ride along the surface of the film through its entire upward or return stroke. While this type of mechanism is the simplest form of the two mentioned, it is objectionable for the reason that it unduly wears the film, is relatively noisy, and necessitates a relatively heavy gate tension. In the positive type of claw pull-down mechanism, the operating mechanism includes cam means for moving the claw into and out of the film perforations as well as for reciprocating the claw up and down so that the claw does not engage the film during the return or upward stroke.

It is common practice in both of these above-mentioned types of claw pull-down mechanisms to pivot the claw arm at one end and to one side of the film gate so that during the pull-down stroke the claw actually traverses an arcuate path rather than a rectilinear one. Obviously, if the claw arm could be made any desired length, then the radius of curvature of the arc through which the claw would travel could be made so long that there would be no serious restrictions on the number or spacing of claws which could be used on the arm and still have them all simultaneously engage the film perforations. However, it has been found that the practical limitations on the length of such claw arms, even in projectors where longer arms are possible than in camera constructions, makes it impractical to use more than two claws on the end of the claw arm which are spaced from one another by an amount equal to one perforation pitch. A greater spacing of the two claws is prevented because the arc of movement of the claws will preclude both claws from

2 remaining in alignment with the row of film perforations at the gate through the complete pull-down stroke. This enforced limitation as to multiple claw spacing has the disadvantage that this type of claw mechanism will not feed film having more than one successive perforation torn out.

The primary object of the present invention is to provide an improved form of claw pull-down mechanism including a pivoted claw arm which will satisfactorily feed film having two or more successive perforations torn out.

Another object is to provide a claw pull-down mechanism of the type described wherein in addition to the primary claw, the claw arm carries an auxiliary claw which is spaced from the primary claw by an amount equal to the spacing between two or more film perforations, said auxiliary claw being confined to a rectilinear movement substantially in alignment with the row of film perforations moving through the film gate despite the normal tendency for the same to move in an arcuate direction from such alignment.

And a further object is to provide a claw pull-down mechanism of the type described wherein the auxiliary claw is fabricated from such a material, and is so mounted on the claw arm, that it is capable of flexing in a direction parallel to the plane of the film and is confined to a rectilinear movement by having a sliding engagement with a rigid guiding surface disposed adjacent or on the film gate.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings in which Fig. 1 is a partial elevational view of a motion-picture projector incorporating a film pull-down mechanism including a novel claw and operating guide therefor constructed in accordance with a preferred embodiment of the present invention;

Fig. 2 is an enlarged sectional detail taken substantially on line 2—2 of Fig. 1 and showing how the claw arm is pivoted;

Fig. 3 is an enlarged sectional view taken substantially on line 3—3 of Fig. 1;

Fig. 4 is an enlarged sectional view taken substantially on line 4—4 of Fig. 1 and showing how the primary and auxiliary claws cooperate with the guiding slot in the film gate;

Fig. 5 is an enlarged perspective detail showing how the claws are attached to the claw arm and particularly showing the form of the auxiliary claw; and Figs. 6, 7 and 8 are elevational views, enlarged to a scale twice actual size, showing the claw arm successively at the top, the middle and bottom, respectively, of a pull-down stroke and showing how the auxiliary claw cooperates with the guiding slot in the gate to be flexed as the claw reaches both extremes of the stroke and thus be confined to a rectilinear path in alignment with the row of film perforations rather than being allowed to follow the normal arcuate path which the pivotal mounting of the claw arm would dictate.

Generally speaking, the present invention concerns an intermittent film pull-down mechanism of the claw type in which the claw arm is pivoted at one end at a point to one side of the film path, as the result of which the film engaging claw on the other end of the arm moves through an arc during the pull-down stroke. In order to be able to feed films having more than one torn perforation, I provide the free end of the claw arm with an auxiliary claw which is spaced from the primary feeding claw in a direction substantially at right angles to the claw arm by a distance equal to two or more perforation pitches. This auxiliary claw is adapted to engage a perforation spaced two or more perforations from that engaged by the primary claw and, at the same time, the primary claw engages its perforation so that if two or more perforations are torn out and the primary claw won't take hold, then the auxiliary claw will properly advance the film strip. To account for the arcuate movement of this auxiliary claw which would normally cause it to move laterally of the film path from alignment with the row of film perforations, particularly at the extreme ends of its stroke, I propose to make it in such a way and from such a material that it is capable of flexing in a direction parallel to the film plane. Then I provide a rigid guide adapted to be engaged by said auxiliary claw for confining it by virtue of a flexing action to a rectilinear movement coincident with the path of the row of perforations on the film moving through the gate and as the result of which said auxiliary claw will be in a position to properly engage a film perforation at any point in its pull-down stroke.

While for purposes of disclosure I have shown my invention incorporated in a motion-picture projector having a pivoted claw mechanism of the positive type, this improved claw and associated mechanism can also be used on a motion-picture camera having a ratchet-type pull-down mechanism, as will be obvious from the following disclosure.

Referring now to the drawings, I have shown my present invention in combination with a motion-picture projector pull-down mechanism of the type disclosed and claimed in U. S. Patent 2,521,957 and of which I am coinventor. This projector comprises a casing 10 having a transverse wall 11 provided with an opening 12 past which the film F is adapted to be intermittently moved in a vertically downwardly direction. The film F is moved stepwise past a projection aperture 13 in a suitable spring-pressed gate member 14, see Fig. 4, the aperture 13 being in alignment with opening 12 and the two being illuminated by any suitable illuminating system, not shown. That part of the transverse wall 11 including opening 12 may be provided with a vertically-extending elongated recess 15 in which the film strip F is held flatwise by movable gate member 14 so as to be guided in its travel past the projection aperture 13 for projection purposes. Accordingly, the part of the wall 11 including recess 15 and opening 12 constitutes the fixed member of the film gate while member 14 is the movable gate member which permits threading of the film therethrough.

The film is adapted to be fed stepwise through the gate by a film-feeding mechanism including a rigid claw arm 21 extending laterally of the film to be fed and pivoted at its left-hand end looking at Fig. 1, on a ball 42 seated in a recess 41 in a stationary plate 40 supported by, and extending parallel to, wall 11 and a seat 43 in the claw arm. This particular type of pivotal mounting, which is more fully described in the above-noted U. S. Patent 2,521,957, allows the free end of the claw arm to pivot freely in both an edgewise and a flatwise direction. The end of the claw arm is held in assembled relation on the ball 42 by a spring arm 44 fixed at one end 45 to the plate 40 and having its free end 46 engaging and pressing a smaller ball 47 into a seat 48 in the end of the claw arm at a point between ball 42 and another small ball 49 disposed between the wall and a seat 50 in the arm. In order to prevent the pivot assembly from pulling apart under an abnormal claw load, the left or pivoted end of the claw arm is provided with a turned-down ear 51 which extends into a slot 52 in the stationary plate 40.

Normally, the right-hand end of the claw arm is provided with one or, at the most, two primary claws or teeth 22 turned at right angles to the body of the arm and which are adapted to engage perforations 23 in the film strip in order to feed the same. In the arrangement shown, the up-and-down reciprocal movement of the claw arm edgewise for feeding the claw is under the control of a peripheral cam 24 fixed to the shutter shaft 17 which is, in turn, driven at a constant speed by a motor, not shown; the claw arm being provided intermediate its ends with a follower 25 for engaging the cam, see Figs. 1 and 3. The claw arm is normally moved upwardly by the arm 26 of a double-ended spring 27 located on a lug 28 on the wall 11 and having its other end or arm 27' anchored against a boss, not shown, extending from the wall of housing 10. As most clearly shown in Fig. 3, the arm 26 of spring 27 is confined by a flanged collar 32 rotatably mounted on the stud 33 which fixes the cam follower 25 to the claw arm. Accordingly, the arm 26 of spring 27 provides the force necessary to pivot the claw upwardly or to a rest position, while peripheral arm 24 only controls the extent of the upward movement but moves the claw downwardly edgewise for its film-feeding stroke.

In the arrangement shown, the claw is adapted to be completely retracted from the film path for movement to its raised position and to again be moved into engagement with a successive film perforation prior to the subsequent feeding stroke of the claw. To this end, the arm 26 of the spring 27 is bent laterally to normally exert a pressure against the inside face of the claw arm to pivot it in a flatwise direction away from the film. The movement of the claw on the arm into engagement with the film is effected by a face cam 35 on the shutter shaft 17 engaged by the front vertical face of the follower 25.

That part of the film-advancing mechanism described up to this point is well known, being shown in U. S. Patent 2,529,157, and per se does not constitute the present invention. It has been disclosed as showing one form of claw pull-down mechanism having the claw arm pivoted laterally to one side of the film path so that the claw thereon tends to move in an arc extending laterally of the film path during the stroke of the claw and as the resutl of which arcuate movement the problem of keeping the claws in alignment with the row of film perforations arises. It is in combination with pull-down mechanisms having a claw movement of this nature that the present invention is useful as will now be set forth.

It has been found that when using claw pull-down mechanisms having the claw arm pivoted in this manner, the arcuate path of the claw limits the number of teeth or claws which can be used and still maintain them all in alignment with the row of film perforations in the gate at both ends of the claw stroke. If the claw arm has to be relatively short because of the nature or size of the apparatus on which it is used, i. e., a camera, then the arc through which the claw moves may be so abrupt that such a claw mechanism cannot be used at all because of the fact that the lateral movement thereof during its stroke is greater than the width of the film perforation path and the claw and therefore fails to properly register with the perforations at the ends of its stroke. In many applications of such pull-down mechanisms, the claw arm is sufficiently long to allow the use of a single claw and, in the larger applications such as the projector shown, the claw arm may be made long enough so that the arc of movement will permit the use of two claws separated by an amount equal to the perforation pitch so that the claws will engage successive film perforations. However, in the most satisfactory application of such a pull-down mechanism, i. e., that providing for the use of two claws spaced one perforation's distance apart, the mechanism is unable to handle or feed film strips having more than one torn film perforation and will fail to feed film having two or more successive perforations torn out or damaged.

The present invention which will now be described has to do with an improvement in claw pull-down mechanisms of this general nature which will permit such a mechanism to properly feed film strips having two or more successive perforations torn out and is of such a nature that it can be readily added to any existing claw pull-down mechanism of this type with little difficulty. According to the present invention, it is proposed to add an auxiliary claw 60, of the form best shown in Figs. 4 and 5, to the end of the claw arm 21 in such a way that a perforation engaging tooth 61 thereon is spaced from primary tooth or claw 22 by two or more perforation pitch distances and which tooth 61 is adapted to engage a film perforation lower down in the film travel each time claw 22 engages a perforation. In the embodiment shown, the auxiliary claw has its tooth 61 spaced from primary claw by three perforation pitches so that this particular arrangement of parts will properly feed film strips having up to three successive perforations torn out. Should claw 22 meet a torn film perforation, then auxiliary claw or tooth 61 will pick up another perforation to feed the film, and the length of the auxiliary claw will determine, and can be chosen to pass, any number of consecutive torn-out perforations as may be desired within practical limits, of course. Auxiliary claw 60 is fabricated from a relatively thin flat stock and is riveted or otherwise fastened to a right angle bracket 67 on the end of the claw arm 21 so that it lies substantially at right angles to the longitudinal axis of the claw arm and, hence, has its faces lying in planes at right angles to the film path so that the tooth 61 extending from one edge thereof will be adapted to move toward and from the film path. To point out how this auxiliary claw can be readily added to existing apparatus, I have shown the primary claw 22 carried by the right angle bracket 67 which is, in turn, riveted at 68 to the end of the claw arm 21.

With auxiliary claw 60 extending at right angles to the longitudinal axis of claw arm 21 in this manner, and by an amount equal to two or more perforation pitches, some means must be provided to confine the movement of the tooth 61 thereon to a substantially rectilinear path coincident with that of the film perforations as they move through the gate whereby it will be in a position to properly engage the perforations at both ends of the stroke of the claw arm. To this end, the auxiliary claw 60 is made of a flexible material and is flexible in a flatwise direction parallel to the film path while being rigid in a direction at right angles to the film path. The lower end of this auxiliary claw is guided by the side walls of a slot 65 in one of the gate members, in this case, that portion of wall 11 recessed to form a stationary gate member and which, in this case, also permits the primary claw 22, as well as the tooth 61 of the auxiliary claw, to move into and out of the film path to engage and disengage, respectively the film perforations. This slot 65 can be an extension of the slot normally found in the film gate for the primary claw 22 or it may be a separate slot spaced longitudinally from said first slot and provided solely to accommodate said auxiliary claw.

As clearly shown in Fig. 5, the auxiliary claw 60 is provided near its free end with a bearing portion 66 which is long relative to the height of tooth 61 and which is adapted to engage the side walls of the slot at all times or when the claw arm is in the vicinity of either of its extreme upper and lower positions for guiding purposes. This separate bearing portion 66 is located near the free end of the auxiliary claw so that the desired flexing action will be directed to the claw at the most desirable point and is provided to produce this flexing action rather than letting the tooth 61 do it because to put such a transverse load on the small tooth would be impractical. The in-and-out movement of the claws relative to the film path is not sufficient to remove the bearing surface 66 from guiding relation of the walls of slot 65 even during the return stroke of the claws or when the claws are removed from the film path.

In Figs. 6-8, I have illustrated the pull-down claws in the two extreme, as well as the intermediate, positions they assume relative to the path of the film perforations during a complete pull-down stroke, in order to show how and why the auxiliary claw or tooth 61 thereon is, and must be, confined to a rectilinear movement coincident with the path of the film perforations if it is to properly engage such perforations at any and all times.

In Fig. 6, the claws 22 and 61 are in the position they assume when at the top of their pull-down-stroke, and it will be seen that the primary claw 22 which normally follows the arc A is almost to the left-hand edge of its perforation. Normally in this position the tooth 61 on the auxiliary claw 60, which is adapted to engage a perforation spaced three perforation pitches from that engaged by primary claw 22, would extend outside of the path of the perforations but it is flexed inwardly toward the pivot of the claw arm by an amount sufficient to align it with the row of perforations. At this point, it might be desirable to point out that the slot 65 is slightly more narrow than the film perforations, as shown in the drawings, to insure that the auxiliary claw will enter the film perforations with a suitable amount of clearance.

Now moving down to the intermediate position illustrated in Fig. 7, it will be seen that the primary claw 22 has moved outwardly slightly in its perforation due to its moving in arcuate path A. Since auxiliary claw 60 normally extends orthogonally of claw arm 21, in this position its tooth 61 will engage its perforation at substantially the same lateral location as primary claw 22 engages its perforation and no confining flexing action is produced on the auxiliary claw. This is evidenced by the fact that the faces of auxiliary claw 60 are free from engagement with the side walls of slot 65 in this position.

In the extreme lower end of the pull-down stroke, see Fig. 8, the primary claw 22 is moved back toward the inner edge of the perforation engaged thereby and correspondingly rectilinearly of the film path to that position it occupied in the extreme upper position of the claw. On the other hand, the tooth 61 on auxiliary claw 60 would normally assume a position laterally outside of the row of perforations and to the left thereof looking at Figs. 6–8. This is prevented by the bearing portion 66 engaging the other or inner wall of the slot 65 and flexing the free end of said auxiliary claw in the opposite direction to that in which it was flexed in its extreme upper position so as to confine it to alignment with the row of perforations. Arc B in Figs. 6–8 indicates the path of movement that the tooth 61 on the auxiliary claw 60 would normally take if unrestricted, and clearly shows that the confining flexing action therein in each of the extreme upper and lower positions of the claws is required so that the auxiliary claw will not assume a position outside the path of the row of film perforations.

While the auxiliary claw could be made of any suitable material which possesses the necessary flexibility and resistance to frictional wear, i. e., spring steel, certain plastics, etc., I have found that a particularly good material for this claw is a synthetic plastic of the nylon type, examples of such a plastic material being fully described in U. S. Patent 2,071,250. This plastic material not only possesses the necessary flexibility when made up in flat, thin sheets, but is highly resistant to frictional wear, is quiet in operation, and has a very desirable self-lubricating action. This self-lubricating action is particularly useful in this application because it will be obvious that it would be difficult from a practical standpoint to adequately lubricate the walls of slot 65 and the flat faces of auxiliary claw 60.

Although I have shown and described certain specific embodiments of my invention, I am fully aware that many modifications thereof are possible. My invention, therefore, is not to be restricted to the precise details of construction shown and described but is intended to cover all modifications coming within the scope of the appended claims.

Having thus described my invention, what I claim as new and desire to secure by Letters Patent of the United States is:

1. In an intermittent film-feeding mechanism the combination of a film gate providing a straight path through which a perforated film strip is adapted to be fed in a longitudinal direction, a rigid elongated claw arm extending laterally to one side of said film path and pivoted at one end removed from said path to allow the desired edgewise arcuate movement for intermittently advancing the film through the gate, a primary claw fixed to the free end of said claw arm and extending substantially at right angles thereto, cam means engaging said claw arm intermediate its ends and adapted to control movement of the arm arcuately of its pivot to advance the film one frame at a time, and an auxiliary claw fixed to the free end of said arm to move therewith and spaced from said primary claw in the direction of movement of the film by a multiple of the spacing between the individual perforations of said film, whereby while said primary claw is adapted to engage one perforation the auxiliary claw is adapted to engage another perforation removed therefrom by more than one perforation pitch, and means for confining said auxiliary claw to a substantially reciprocal rectilinear movement longitudinally of said film path in alignment with the row of perforations in said film in opposition to a normal arcuate movement in the plane of said film path resulting from the pivotal mounting of said claw arm.

2. In an intermittent film-feeding mechansim the combination of a film gate providing a straight path through which a perforated film strip is adapted to be fed in a longitudinal direction, a rigid elongated claw arm extending laterally to one side of said film path and pivoted at one end removed from said path to allow the desired edgewise arcuate movement for intermittently advancing the film through the gate, a primary claw fixed to the free end of said claw arm and extending substantially at right angles thereto, cam means engaging said claw arm intermediate its ends and adapted to control movement of the arm arcuately of its pivot to advance the film one frame at a time, an auxiliary claw fixed to the free end of said arm to move therewith and spaced from said primary claw in a direction longitudinally of said film path by a multiple of the spacing between the individual perforations of the film, whereby while said primary claw is adapted to engage one perforation of the film the auxiliary claw is adapted to engage another perforation removed therefrom by more than one perforation pitch, and means for confining said auxiliary claw to a substantially reciprocal rectilinear movement longitudinally of said film path in alignment with the row of perforations in the film in opposition to a normal arcuate movement in the plane of said film path resulting from the pivoted mounting of said claw arm, said last-mentioned means comprising fabricating the auxiliary claw from a material and in such a manner that it is flexible in a flatwise direction and substantially rigid in an edgewise direction, mounting said auxiliary claw on the end of said claw arm adjacent one end so that it is free to flex flatwise in a plane parallel to said film path, and a rigid guiding surface extending rectilinearly substantially longitudinally of said film path and adapted to engage a portion of said auxiliary claw at a point removed from its point of attachment to said claw arm to confine it to a rectilinear movement as opposed to an arcuate movement by flexing said claw.

3. In an intermittent film-feeding mechanism the combination of a film gate providing a straight path through which a perforated film strip is adapted to be fed in a longitudinal direction, a rigid elongated claw arm extending laterally to one side of said film path and pivoted at one end removed from said path to allow the desired edgewise arcuate movement for intermittently advancing the film through the gate, a primary claw fixed to the free end of said claw arm and extending substantially at right angles thereto, cam means engaging said claw arm intermediate its ends and adapted to control movement of the arm arcuately of its pivot to advance the film one frame at a time, an auxiliary claw fixed to the free end of said arm to move therewith and spaced from said primary claw in a direction longitudinally of said film path by a multiple of the spacing between the individual perforations of the film, whereby while said primary claw is adapted to engage one perforation of the film the auxiliary claw is adapted to engage another perforation removed therefrom by more than one perforation pitch, and means for confining said auxiliary claw to a substantially reciprocal rectilinear movement longitudinally of said film path in alignment with the row of perforations in the film in opposition to a normal arcuate movement in the plane of said film path resulting from the pivoted mounting of said claw arm, said last-mentioned means comprising fabricating the auxiliary claw from a material and in such a manner that it is flexible in a flatwise direction and substantially rigid in an edgewise direction, mounting said auxiliary claw on the end of said claw arm adjacent one end so that it is free to flex flatwise in a plane parallel to said film path, said film gate provided with a rectilinear slot extending longitudinally of said film path substantially in alignment with the row of perforations on the film guided thereby, a portion of said auxiliary claw removed from the point of attachment thereof extending into and being confined to a rectilinear movement by the sides of said slot.

VERNON H. JUNGJOHANN.

No references cited.